G. W. MINKLER.
CELESTIAL SPHERE FOR USE IN SCHOOLS AND COLLEGES.
APPLICATION FILED MAR. 7, 1914.
1,162,300.
Patented Nov. 30, 1915.
4 SHEETS—SHEET 1.
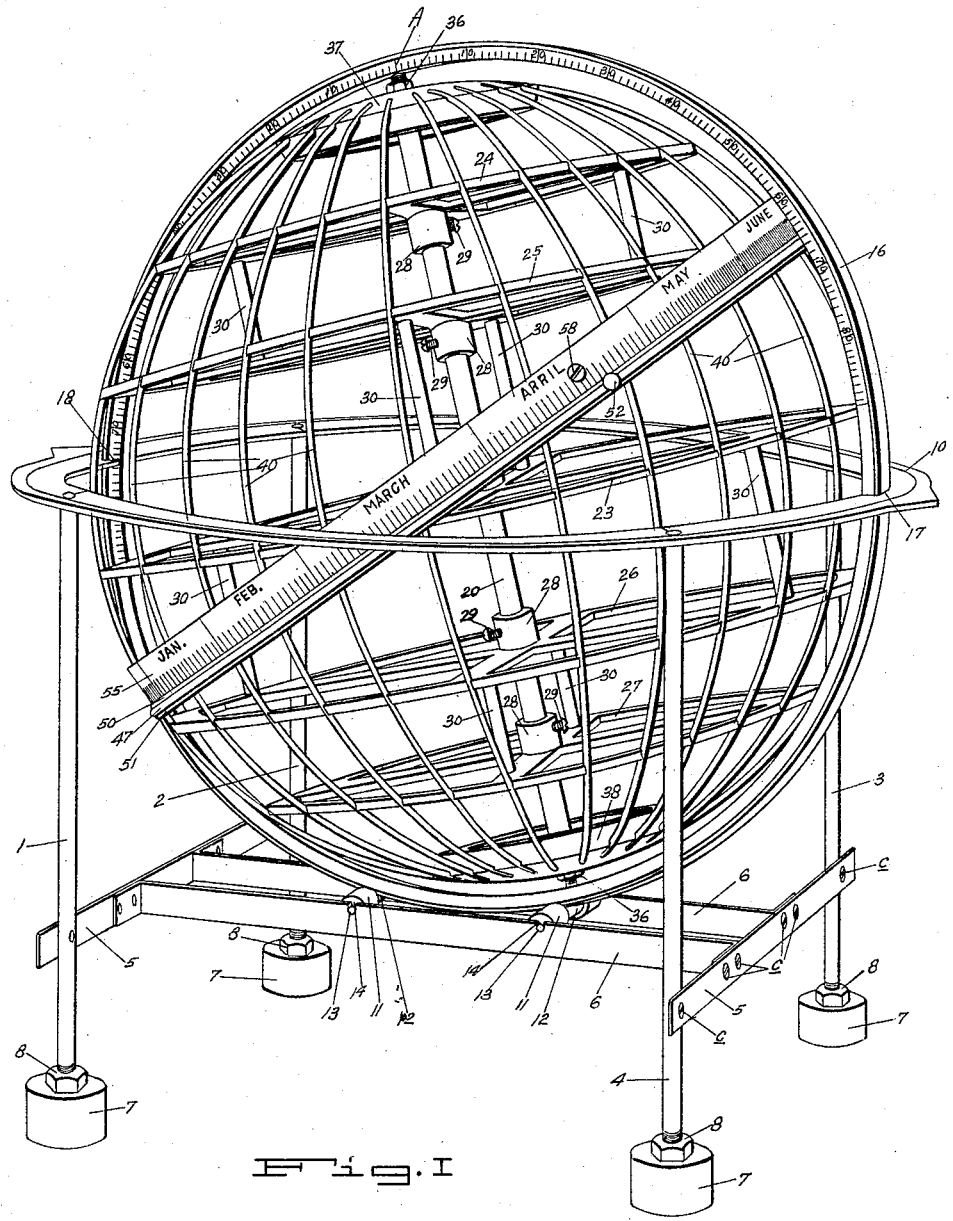
Fig. I G. W. MINKLER.
CELESTIAL SPHERE FOR USE IN SCHOOLS AND COLLEGES.
APPLICATION FILED MAR. 7, 1914.
1,162,300.
Patented Nov. 30, 1915.
4 SHEETS—SHEET 2.
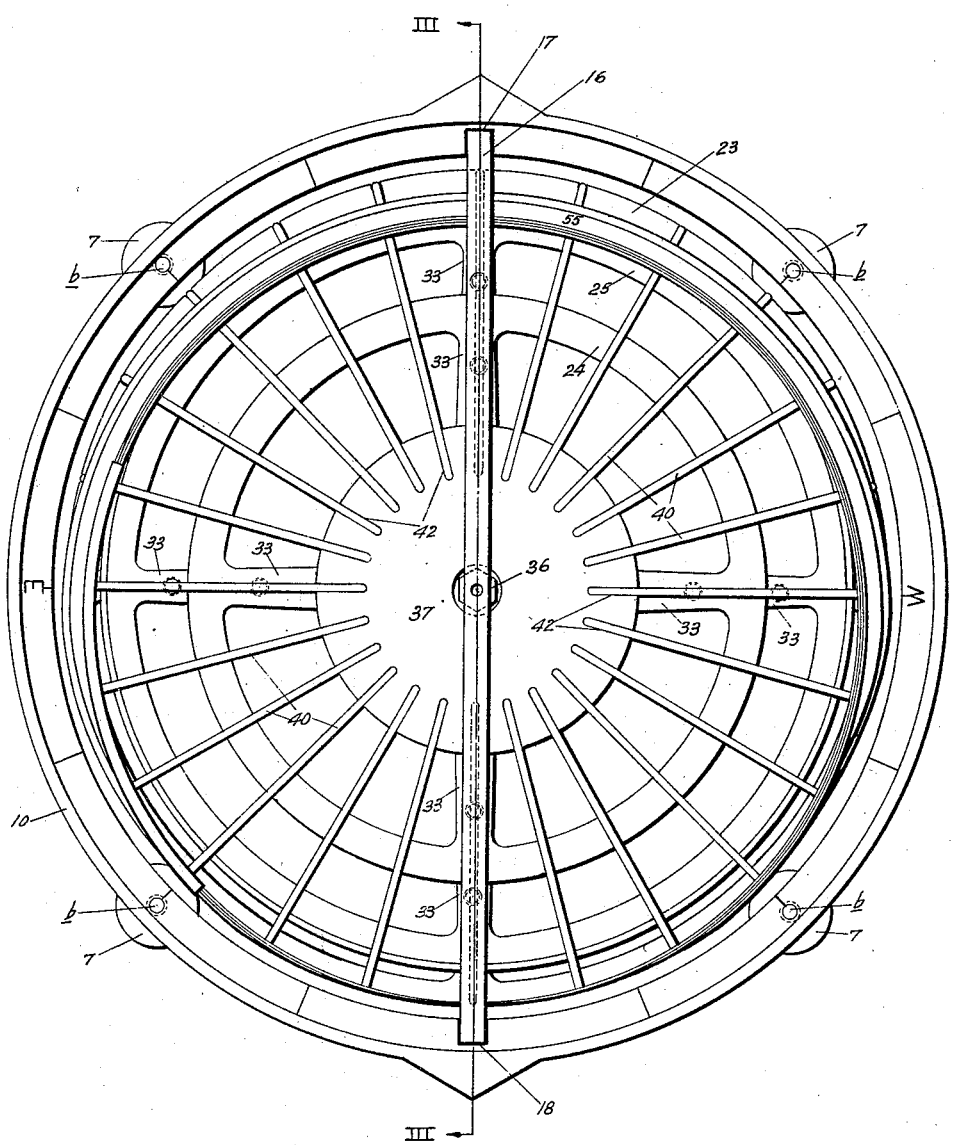
Fig. II

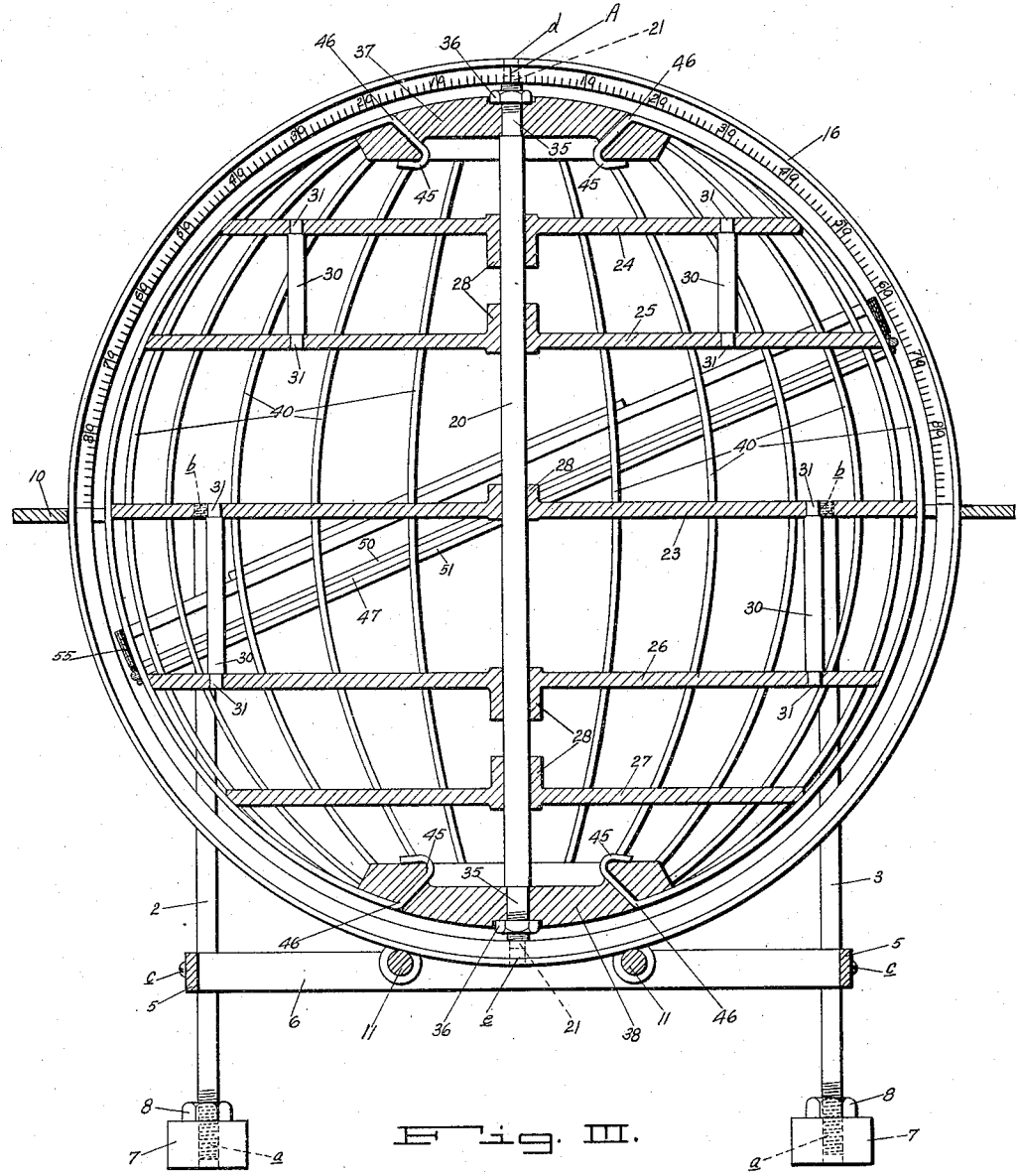

G. W. MINKLER.
CELESTIAL SPHERE FOR USE IN SCHOOLS AND COLLEGES.
APPLICATION FILED MAR. 7, 1914.
1,162,300.
Patented Nov. 30, 1915.
4 SHEETS—SHEET 4.
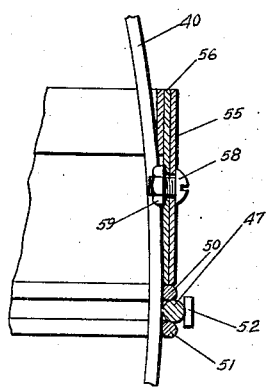
Fig. V
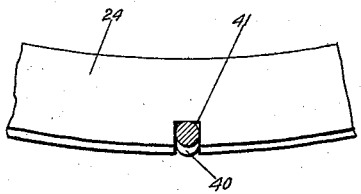
Fig. VI
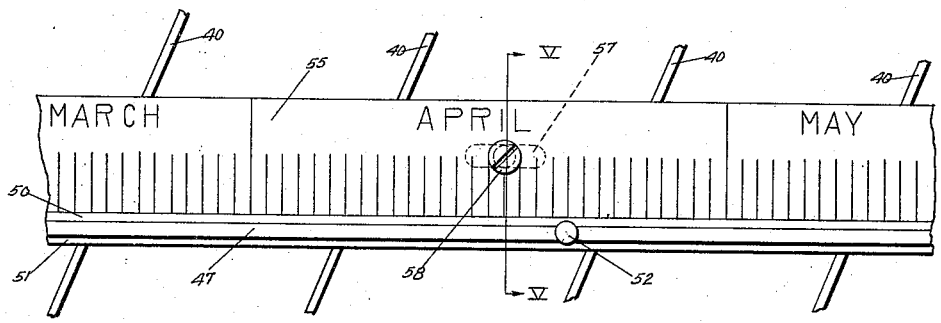
Fig. IV
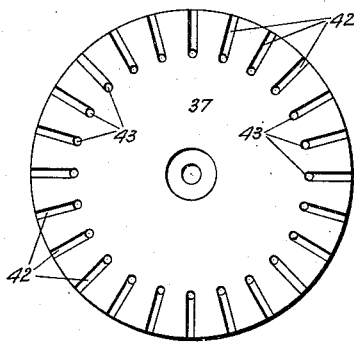
Fig. VII
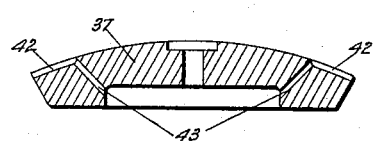
Fig. VIII
Witnesses:
Howard O. Rogers
Mabel H. Neville
Inventor:
George W. Minkler
By Joseph T. Atkins,
Attorney.

UNITED STATES PATENT OFFICE.

GEORGE WEBSTER MINKLER, OF VANCOUVER, WASHINGTON.

CELESTIAL SPHERE FOR USE IN SCHOOLS AND COLLEGES.

1,162,300. Specification of Letters Patent. Patented Nov. 30, 1915.

Application filed March 7, 1914. Serial No. 823,267.

*To all whom it may concern:*

Be it known that I, GEORGE W. MINKLER, a citizen of the United States, residing at Vancouver, in the county of Clarke and State of Washington, have invented certain new and useful Improvements in Celestial Spheres Especially Adapted for Use in Common Schools as Well as Colleges; and I do declare the following to be a full, clear, and exact description of the invention, reference being had to the accompanying drawings, and to the letters and figures of reference marked thereon, which form a part of this specification.

My invention relates to astronomical apparatus, particularly to globes representative of the celestial sphere.

One object of my invention is to produce a globe of the class designated, which possesses in its mechanical aspect certain structural features of novelty and utility that contribute to the stability and durability of the apparatus, in use, and to its convenience for shipment.

Another object of prime importance is to produce apparatus which being adapted to afford means, convenient and accurate to the degree of exactitude, for representing and marking the position of the sun (or of any fixed star) for any day of the year, and the aspect of the celestial sphere for any latitude, may be made to exhibit the various important facts of the sun's apparent annual motion and the consequent change of seasons, whereby numerous questions relating to these matters are immediately upon inspection of the apparatus only answered in clear and unmistakable terms.

What constitutes my invention will be hereinafter specified in detail and succinctly set forth in the appended claims.

In the accompanying drawings which constitute a part of this specification, Figure I is a perspective view of a preferred form of embodiment of my invention with its parts complete and assembled as in use. Fig. II is a top plan view of the same in that position in which the celestial pole represented and the imaginary terrestial pole coincide. Fig. III is a diametrical section, as on the line III—III of Fig. II. Fig. IV is a side elevation, on an enlarged scale of a portion of the ecliptic calendar-ribbon illustrative of the means of adjustment of the same, in order to afford correct representation of the day of March (conventionally the 21st) when the sun crosses the line. Fig. V is a section on the line V—V of Fig. IV. Fig. VI is a detail view showing the preferred means of mechanically uniting the longitudinal ribs to the equatorial ring of the globe. Fig. VII is a top plan view of a pole-cap detached. Fig. VIII is a diametrical section of the same.

Referring to the numerals on the drawings 1, 2, 3, and 4 indicate, respectively, four legs that are, as by cross pieces 5 and parallel bars 6, rigidly assembled to constitute a stand or support for my globe proper. Each leg is preferably provided at its lower end with a rubber foot-piece 7. Each foot-piece is preferably provided with a socket for the reception of the leg, whose lower end $a$ is preferably threaded to carry a set nut 8 adjustably against the face of its foot-piece.

At its upper end, each leg is preferably provided with a threaded terminal $b$ that screws into a suitably threaded aperture provided for it in the horizon-ring 10. The ring 10 is preferably graduated to indicate degrees of a circle and marked with the initial letters of two or more cardinal points of the compass. Preferably, the legs 1, 2, 3, and 4, respectively, enter the ring 10 at points equidistantly disposed between the said points of the compass, or in other words a leg is provided at the N.E., N.W., S.W., and S.E. points of the compass, respectively, as indicated on the ring 10.

The respective legs 1, 2, 3, and 4 being assembled with the cross pieces 5 and bars 6 as by aid of screws $c$ may be united or disunited, as required, speedily and conveniently, and when disunited, as for shipment in commerce, the several elements are no more than single straight members that may be packed together with greatest economy of space.

A pair of bars 6 in parallel disposition one toward the other is preferably provided, in order to accommodate a pair of rollers 11, each being provided with a peripheral groove 12 and with terminal journals 13, which find their bearings in boxes 14 let into the respective bars from above. The rollers 11 are disposed in parallel relationship toward each other upon the bars 6, and are separated by a sufficient distance to afford a firm rotative support for a ring 16 which, in respect to its function, I denominate the latitude-ring. This ring should be made of any suitable material such as brass and of cross section dimensions sufficient to afford in it a stiff and rigid support for the globe proper. It is supported rotatably within the alined grooves 12 of the rollers 11 as by slip fitting notches 17 and 18 that are disposed in diametrical opposition to each other in the horizon-ring 10 (see Fig. II). The upper half of the latitude-ring 16 is inscribed, as illustrated in Figs. I and III, with graduations indicating degrees of the circle, ninety degrees being inscribed upon one side of the unit or polar mark, A, and ninety degrees upon the other side thereof, both divisions of said graduations reading, preferably, from the unit mark A. The apparatus being preferably constructed throughout with that exactitude common in instruments of precision, the inside diameter of the ring 10 should equal that of the outside diameter of the ring 16, and the rollers 11 should be disposed to bring both markings of 90° upon the ring 16 as well as the center of said ring exactly in the plane of the upper surface of the ring 10. Consequently when the polar mark A is vertical to the plane of the ring 10 the terrestrial and celestial poles are represented thereby as coincident, and any dip of the mark A to the north of the ring 10 may be read directly in terms of latitude north, from the graduations on the ring 16, sharply indicated by the adjacent upper edge of the notch 17 or 18.

Between and within diametrically opposite bearings $d$ and $e$, disposed, preferably with such nicety as mechanical accuracy will permit, coaxially with the pole marked by the letter A, I provide a polar shaft 20 which, somewhat exceeding in length the diameter of the ring 16, is provided at its opposite ends, respectively, with journals or shouldered terminals 21 made to fit, interchangeably by preference, the bearings $d$ and $e$. To assemble the shaft 20 with the ring 16 a slight compression of the sides of the ring exerted between the bearings $d$ and $e$ will suffice to elongate the ring 16 enough to admit the journals 21 to enter said bearings. The resiliency of the ring 16 will upon release thereof restore it to its normal circular shape and confine the shaft 20 rotatably within its bearings $d$ and $e$.

The shaft 20, besides being the axial support for my globe proper, is by my invention preferably made the main assembling member of the parts thereof, or that member whereby and whereon all the other constituent elements of the globe proper are assembled and united. This becomes an important detail when it is considered that it lies at the root of the construction by which my globe proper in its mechanical aspect and preferred form of embodiment, is made to be readily assembled or disassembled, whereby repairs, if necessary, are facilitated, and its ordinary bulk may be reduced to comparatively small compass for shipment, and whereby it may be readily set up for use after reaching a destination remote from the factory.

The globe which, in use, the shaft 20 carries represents, as from the outside thereof, the celestial sphere as it presents itself from the inside to the eye of an observer upon the earth, which is therefore, in imagination only, located at the center of the globe. The said globe, having the shaft 20 for its axis, is divided into two hemispheres by an equatorial circle and each hemisphere is divided by other circles parallel to the equator and of familiar denomination.

I prefer to employ in the construction of my globe proper a structural ring 23 to represent the equator, and also four rings 24, 25, 26 and 27, two above and two below it to represent with accuracy the circles of latitude of the Northern and Southern Hemispheres, respectively, namely the tropical, equatorial and 45° circles. Each of said five rings is preferably independently and rigidly secured to the shaft 20 as by a central hub 28 and a set screw 29 therein for each ring, and each ring is, in like manner, accurately spaced toward each other ring and united each to its next neighbor as by brace rods 30 disposed at suitable intervals between the several rings throughout the structure. The rods 30 may be conveniently secured in place as by the aid of reduced ends 31 which, fitting into apertures provided to receive them in the aforesaid rings respectively, project through the rings a sufficient distance to permit of the forming upon said respective ends a rivet for final assemblage. The central hub 28 of each ring is carried, preferably, by radial arms 33 extending between it and its ring. At its opposite ends the shaft 20 is provided with a reduced portion 35 having a threaded extremity and a nut 36 to accommodate and securely hold between them a pole-cap, indicated by 37 for the north pole-cap and by 38 for the south pole. Each cap preferably extends 23° 27′ 7″ from its center so as to offer its periphery to represent a polar circle.

The rings and the pole-caps are preferably made of a light weight metal, for example aluminum, and when secured to the shaft above described constitute therewith a solid unit or globe frame. The globe proper being preferably of skeleton structure is in such case completed by the addition of longitude-ribs 40 preferably twenty four in number which are spaced equidistantly and secured in place about the globe-frame to represent meridian lines at every fifteen degrees.

I prefer to construct each rib 40 of heavy spring wire, say of brass, and to fix it in place upon the globe-frame by fastening its opposite ends to the pole-caps, respectively, and by locating its intermediate extent in notches 41 provided for it in the respective rings 23, 24, 25, 26 and 27, each notch being gaged to such depth as will bring the surface of the rib flush with the various members of the globe-frame at their several junctions.

As a preferred means of securing the ends of the ribs 40 to the pole-caps, respectively, I provide in the latter twenty four equidistant radial grooves 42 (compare Figs. II and III) and at the inner end of each groove a perforation 43 to receive one end of the rib 40. By annealing the ends of the rib wire they may be after insertion into the perforations 43, readily clenched therein as indicated at 45 in Fig. III. As the rib wires are preferably fixed into position after the globe-frame is assembled, I prefer, in order to facilitate the assembling operation, to dispose the perforations 43 obliquely to the shaft 20. By this means one end of each rib wire having been inserted into its perforation 43 and clenched, and the bend 46 of the other end thereof having been accurately determined, the straight end of the rib 40, projecting obliquely beyond the said bend 46 so as to correspond to the direction of incline of the perforation may be driven home into the said perforation and clenched.

By aid of the construction and method of assemblage above described, the globe proper may be conveniently and with certainty formed into a rigid structure of regular contour with necessary accuracy of disposition of all its members. The means employed for the purpose lend themselves equally to the setting up of the apparatus either in the factory or at any remote point to which it may be consigned for shipment in commerce. The flexibility of the ends of the rib wires makes it feasible, as for repairs or reshipment, to unclench and reclench their ends to a limited but practicable extent.

An important object of my invention being to construct apparatus to display graphically the various important facts of the sun's apparent annual motion as well as its apparent diurnal motion, I provide around my globe proper an annular 47 which may be made of heavy brass wire having its opposite ends united. It represents the ecliptic and is movably mounted to rotate about the center which is the center of the globe proper, and is restricted to a determined path of movement as by a track, consisting preferably of two rails 50 and 51 surrounding and secured to the globe. Said rails are set a sufficient space apart to accommodate and confine snugly between them the annulus or ecliptic ring 47. The ecliptic ring carries an indicator or small disk 52 secured to it. It represents the sun and affords, mechanically, a means for taking hold of the ring in order, by manipulation, to impart rotation to it.

Surrounding the globe like the ring 47 and in close juxtaposition to it, I provide an ecliptic calendar member or ribbon 55. It too is of annular construction and is inscribed to indicate divisions into the days of each month and the months of the year as partially illustrated in Figs. I and V. Without illustration of all the markings that characterize the ribbon 55 it is deemed to be to advantage, considering the nature of the drawings, to specify that the calendar is inscribed to indicate $365\frac{1}{4}$ unequal parts corresponding to the daily movements of the sun along the ecliptic whereof 186 parts and a fraction are north of the equator and 178 and a fraction south thereof. It is thus adapted correctly to represent the six months' day at the North Pole and that at the South Pole, the former being over a week longer than the latter. In order to enable the calendar-ribbon to give correctly the day of March when the sun crosses the line, I provide means for moving the ribbon backward or forward a degree or two to compensate for the inequality between the solar year and the calendar year.

I prefer as a means of providing for adjustment of the calendar ribbon 55 backward or forward, to mount it upon an annular back-strip 56 surrounding and secured to the outside of the globe proper. A longitudinal slot 57 being provided in the back-strip, a screw bolt 58, introduced through said slot and through an aperture in the ribbon 55, is adapted, by aid of a nut 59 threaded to its inner end, to permit adjustment of the ribbon upon the back-strip or to firmly clamp them together when desired.

The operation of my apparatus may be described as follows: Assuming the invention to be comprehended in the form of embodiment illustrated and in the relative position of the parts shown in Fig. III, for example, it is obvious that a rotation of the globe proper about its axis 20 will cause any given point in the ecliptic ring 47 to revolve in a circle parallel to the equatorial ring 23, which is, in the position shown in Fig. III, in the same plane as the horizontal-ring 10. This fact enables my apparatus to exhibit by aid of the disk 52 the phenomenon of alternate visibility and invisibility of the sun for continuous equal intervals of six months each, that being the period required by the sun in its course apparent to an observer near the pole to cross the line. So long as the disk 52 in the rotation of the globe is above the ring 10 it represents "day" in the Northern Hemisphere and "night" in the Southern Hemisphere and vice versa. By shifting the disk 52, (representing the sun) to any position along its track between the rails 50—51, i. e., any position along the edge of the calendar-ribbon 55 intermediate between March 21st and June 22nd, observing the juxtaposed month and day marked upon the calendar-ribbon 55, then rotating the globe about its axis 20 to bring the disk 52, exactly over the north point of the horizon-ring 10, and then moving the latitude-ring 16, to bring the center of the disk 52 down to the horizon-ring 10, the position of the midnight sun in the north is shown. At the same time the instrument indicates the beginning of one of the "long days" i. e., days with a midnight sun as well as the time on the calendar-ribbon when that "long day" begins. The middle of that "long day" being June 22nd, and the ending of that "long day" being as many days, weeks, or months after June 22nd as the beginning was days, weeks or months before June 22nd, not only are the beginning and ending of the "long days", indicated but also the latitude of an observer on the earth who can witness such a phenomenon, his latitude being denoted on the latitude-ring 16, by the degree mark where the latitude-ring 16 touches the horizon-ring 10. Moreover, by varying the position of the disk 52 along the edge of the calendar-ribbon 55, within the limits already given, one can through reference to the horizon ring 10 find a "day" (as related to the "night"), of any length from an hour to six months long, and likewise, the necessary latitude of an observer on the earth.

In respect to latitudes in which the day is measured by the diurnal rotation of the earth upon its axis, my apparatus affords means through adjustment of the ring 16 to correspond to the latitude and observation of the movement of the disk 52 with reference to the horizon ring 10 for accurately determining the time of sunrise and sunset for any day of the year, at any point of known latitude. Conversely, the time of sunrise or sunset at any place being known the latitude of that place may be ascertained by my machine.

In respect to all questions relating to the rotation of the earth upon its axis, it should be observed that the time of rotation of the earth in covering the distance from one rib 40 to the next equals one hour, said ribs being, as specified, disposed at the distance of fifteen degrees apart. It is in consequence thereof that facts shown by my apparatus may be accurately read in terms of hours and fractions thereof.

It is deemed unnecessary in this specification, addressed as it is to one skilled in astronomy, to attempt to describe or even to enumerate all the uses to which my apparatus may be put, except in so far as to indicate its practical utility. Having proceeded accordingly so as clearly to explain its operation, I deem further detail description of other of the various uses to which my invention may be put to be unnecessary.

What I claim is:

1. In astronomical apparatus the combination, with a horizon-ring adapted to constitute a support, of a rotatable globe within said ring having its axis adjustable to any angle within a fixed plane an indicator adjustable to any point in the ecliptic, and means upon the globe for carrying the indicator whereby said apparatus upon inspection may be made to exhibit the various important facts of the sun's apparent annual motion and the consequent change of seasons for any latitude.

2. In astronomical apparatus the combination, with a horizon-ring adapted to constitute a support, of a rotatable globe within said ring having its axis adjustable to any angle within a fixed plane, an indicator adjustable to any point in the ecliptic means upon the globe for carrying the indicator and a calendar member disposed in juxtaposition to the path of movement of said indicator.

3. In astronomical apparatus the combination, with a horizon-ring adapted to constitute a support, of a rotatable globe within said ring having its axis adjustable to any angle within a fixed plane, an indicator adjustable to any point in the ecliptic means upon the globe for carrying the indicator, and an adjustable calendar member disposed in juxtaposition to the path of movement of said indicator.

4. In astronomical apparatus, the combination with a horizon-ring, and a graduated latitude ring movably mounted therein, of a globe rotatably mounted in the latitude ring, an indicator upon the globe movably mounted in the ecliptic, and means upon the globe for carrying the indicator.

5. A globe proper comprising the combination of a polar-shaft, polar circle defining pole-caps, structural rings representing circles intermediate the poles, and longitudinal ribs.

6. A globe proper comprising the combination of a polar-shaft, polar circle defining pole-caps, structural rings representing circles intermediate the poles, longitudinal ribs, and a circumferentially movable ecliptic ring.

7. A globe proper comprising the combination of a polar-shaft, polar circle defining pole-caps, structural rings representing circles intermediate the poles, longitudinal ribs, a circumferentially movable ecliptic ring, and a calendar ribbon juxtaposed thereto.

8. A globe proper comprising the combination of a polar-shaft, polar circle defining pole-caps, structural rings representing circles intermediate the poles, longitudinal ribs, a circumferentially movable ecliptic ring, and a similarly adjustable calendar ribbon juxtaposed thereto.

9. In astronomical apparatus the combination with a globe support comprising a notched horizon ring, and a latitude ring movably mounted in the notches of the horizon ring, of a pair of parallel rollers having grooves alined with the said notches for supporting and facilitating rotation of the latitude ring.

10. In astronomical apparatus, the combination with a globe support comprising an horizon ring and a pair of grooved rollers, of a vertical globe supporting ring whose inside diameter equals that of the horizon ring, rotatably mounted in the grooves of the rollers and in notches provided for it in the horizon ring.

11. In astronomical apparatus, the combination with a polar shaft, of pole-caps removably secured thereto and longitude ribs connecting the pole-caps.

12. In astronomical apparatus, the combination with a polar shaft, of pole-caps removably secured thereto and removable longitude ribs connecting the pole-caps.

13. In astronomical apparatus, a globe proper comprising a polar shaft, pole-caps, longitude ribs, in combination with structural rings intermediate the pole-caps, and provided with means for detachably securing them to the polar shaft.

14. In astronomical apparatus, a globe proper comprising the combination with pole-caps provided with radial grooves terminating in perforations as specified, of longitude ribs seated respectively in said grooves and having their ends inserted into and secured within said perforations.

15. In astronomical apparatus, the combination with a polar shaft, pole-caps, and longitude ribs connecting the caps, of a structural ring secured to said shaft and representative of the equator, said ring being provided with notches for the reception and locating of said ribs, respectively.

16. In astronomical apparatus, the combination with a polar shaft, pole-caps, and longitude ribs connecting the caps, of a structural ring secured to said shaft and representative of the equator, said ring being provided with notches for the reception and locating of said ribs, respectively, and additional rings representative of circles parallel to the equator.

17. In astronomical apparatus, a globe proper in combination with an annulus, provided with an indicator, movably mounted thereon to represent the ecliptic.

18. In astronomical apparatus, a globe proper surrounded with a pair of parallel rails secured thereto, in combination with an annulus, provided with an indicator, movably fixed between said rails in the line of the ecliptic.

19. In astronomical apparatus, a globe proper in combination with an annulus, provided with an indicator, movably mounted thereon to represent the ecliptic, and a calendar ribbon in juxtaposition to said annulus.

20. In astronomical apparatus, a globe proper in combination with an annulus, provided with an indicator, movably mounted thereon to represent the ecliptic, and an adjustable calendar ribbon in juxtaposition to said annulus.

21. In astronomical apparatus, the combination with a polar shaft, of pole-caps and rings spaced and united by brace rods and secured to the polar shaft, the whole constituting a rigidly united structural unit for the reception of longitude ribs to complete and constitute it into a skeleton globe as set forth.

In testimony whereof, I affix my signature in presence of two witnesses.

GEORGE WEBSTER MINKLER.

Witnesses:
W. H. Harris,
L. D. Denton.

Copies of this patent may be obtained for five cents each, by addressing the "Commissioner of Patents, Washington, D. C."